April 5, 1955   F. U. S. GILBERT ET AL   2,705,584
FULLY AUTOMATIC CAN PACKAGER
Filed May 11, 1954   8 Sheets-Sheet 1

FIG.1

INVENTORS
FRANK U.S. GILBERT &
JOSEPH HARRISON JR.
BY
Ely, Frye & Hamilton
ATTORNEYS April 5, 1955  F. U. S. GILBERT ET AL  2,705,584
FULLY AUTOMATIC CAN PACKAGER
Filed May 11, 1954  8 Sheets-Sheet 3

FIG. 5

INVENTORS
FRANK U.S. GILBERT &
JOSEPH HARRISON JR.
BY
Ely, Frye & Hamilton
ATTORNEYS

INVENTORS
FRANK U.S. GILBERT
& JOSEPH HARRISON JR.
BY
Ely, Frye & Hamilton
ATTORNEYS April 5, 1955    F. U. S. GILBERT ET AL    2,705,584
FULLY AUTOMATIC CAN PACKAGER
Filed May 11, 1954    8 Sheets-Sheet 8

INVENTORS
FRANK U. S. GILBERT &
BY JOSEPH HARRISON JR.
ATTORNEYS

United States Patent Office 2,705,584
Patented Apr. 5, 1955

2,705,584
FULLY AUTOMATIC CAN PACKAGER

Frank U. S. Gilbert, Lakewood, and Joseph Harrison, Jr., Cleveland, Ohio, assignors to Cleveland Cleaner & Paste Company, Cleveland, Ohio, a corporation of Ohio Application May 11, 1954, Serial No. 428,966

16 Claims. (Cl. 226—15)

The present invention relates to machinery for packing cans in paperboard containers or cartons and particularly to a machine for performing such packaging fully automatically.

The advantages of packing cans by machine rather than by hand are obvious, and over the years many types of automatic and semi-automatic packing machines have been designed. Unfortunately, most of these machines are extremely complicated mechanically and are correspondingly costly to build and maintain. Servicing charges or costs amounting, within two or three years, to the original cost of a packing machine are common in the canning industry. Moreover, the structural intricacy and resulting high incidence of mechanical breakdown in packing machines necessitates either the employment of highly skilled maintenance personnel or the purchase of standby replacement machines in order to preclude shutdown of an entire canning operation because of the failure of the packing machine forming part of that operation. The only remaining alternative is to face the prospect of serious financial loss from the shutdown of an entire canning line for several days or weeks.

The present invention has for its object the provision of a fully automatic can packing machine which is mechanically far more simple than those of the prior art and which performs the packing operation rapidly and efficiently. The mechanical simplification of the present invention is made possible by certain novel features described in detail below, among which features is a mechanical system which provides for translation of a paperboard carton over an array of tilted cans in such a manner that the array of cans is scooped up by the carton and carried away therein.

While the novel features of the invention are disclosed in a specific embodiment of the invention described below, it will be apparent that some or all of these features may be included as part of packaging machines which vary in many details from the specific embodiment of the invention described below.

General organization and power drive

Figure 1:
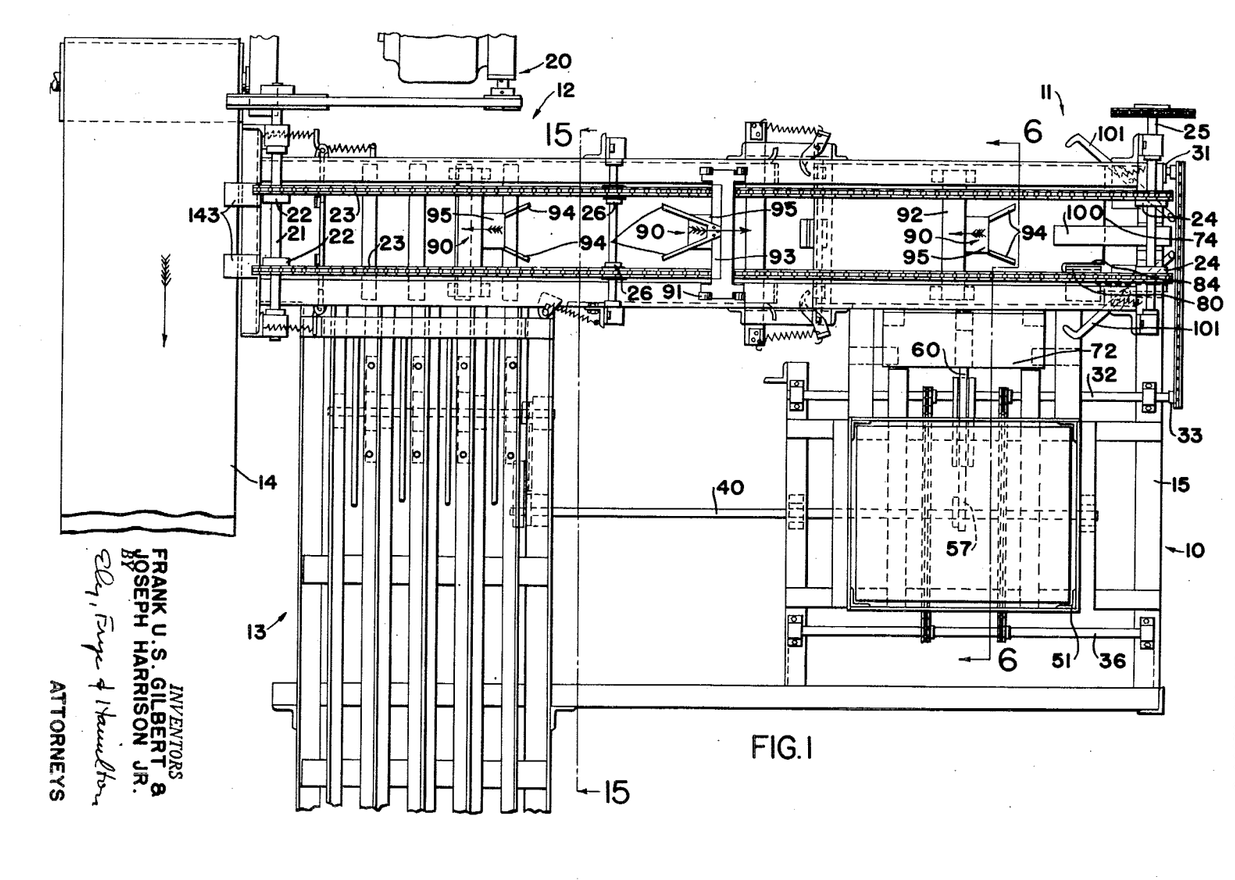
Figure 1 is a plan view of a can packaging machine embodying the invention.

The general organization of the illustrated embodiment may best be seen in Figure 1. The carton magazine is generally indicated at 10, the carton unfolding station at 11, the can loading or can scooping station at 12 and the can feed chutes at 13. Translation of empty cartons occurs between the carton unfolding station 11 and the can loading station 12. An auxiliary belt 14 carries the loaded cartons away from the machine for final gluing and sealing by any suitable conventional means, automatic or otherwise, a variety of which are known to the art.

Figure 2:
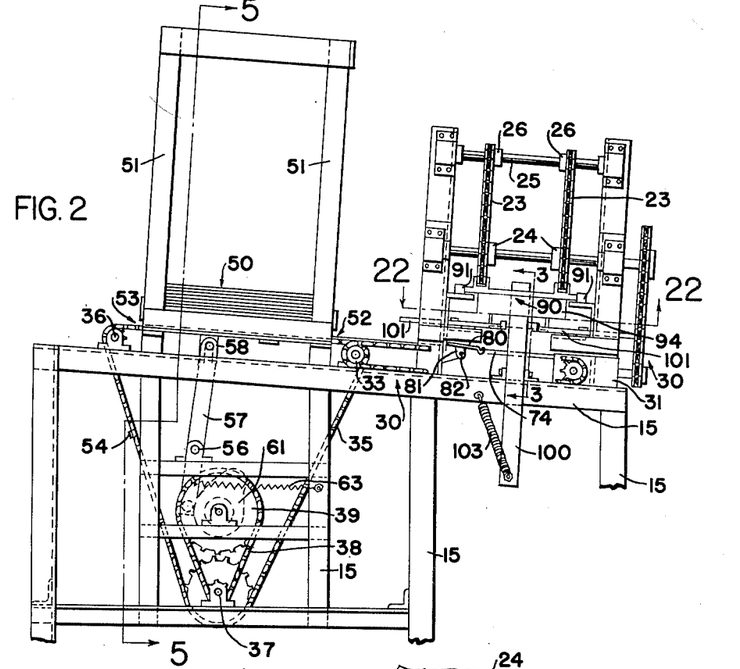
Figure 2 is an elevation taken from the right end of Figure 1.

The power drive for the illustrated embodiment is most clearly shown in Figures 1 and 2. A power means, such as a motor, speed reducer and belt drive, all generally indicated at 20, drives a shaft 21 to which are keyed a pair of sprockets 22 meshing with a pair of chains 23. At the opposite end of the installation, the chains 23 mesh with a pair of sprockets 24 keyed to a shaft 25. At an intermediate station in their upper pass, the chains 23 are supported on a pair of idler sprockets 26 suitably mounted above the general framework of the machine.

Through a power linkage generally indicated at 30 in Figure 2 and including chain and sprocket drives between which a gearbox 31 is operatively located, power from the shaft 25 is transmitted to the shaft 32 through the sprocket 33. A pair of additional sprockets 34 keyed to the shaft 32 are drivingly engaged with a pair of chains 35 which mesh with other pairs of sprockets on the shafts 36 and 37 so that the chains 35 follow an approximately triangular path, as shown in Figure 2. An additional sprocket on the shaft 37 drivingly engages a chain 38 which is meshed with a sprocket 39 keyed to a cam shaft 40. All sprockets on the shaft 37 are keyed thereto.

It will, of course, be apparent that the several elements of the machine are supported on suitable frame members, generally indicated by the reference numeral 15.

Carton magazine and carton unfolding mechanism

Figure 5:
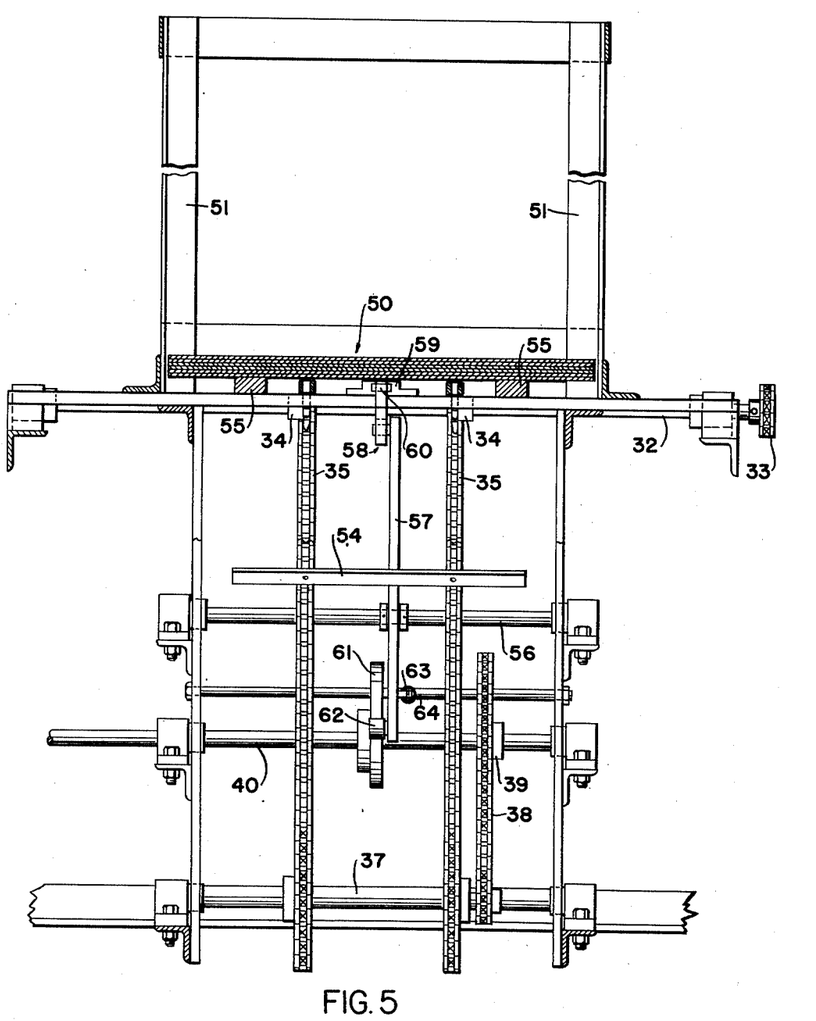
Figure 5 is a view taken on line 5—5 in Figure 2.

As shown in Figures 1, 2, 5 and 6, the carton magazine comprises a framework 51 adapted to receive a stack of folded cartons 50. The front and back of the framework 51 is open or slotted as at 52 and 53 to accommodate passage of a pushbar 54 which extends transversely between and is fixed to the chains 35, as best seen in Figure 5. The cartons are supported above the upper horizontal course of the chains 35 by the bars 55 (Figure 5) and the thickness of the pushbar is such that the edges of one carton at a time are engaged by it to be thereupon urged from the magazine through the slot or opening 52.

Figures 6, 7, 8, 9:
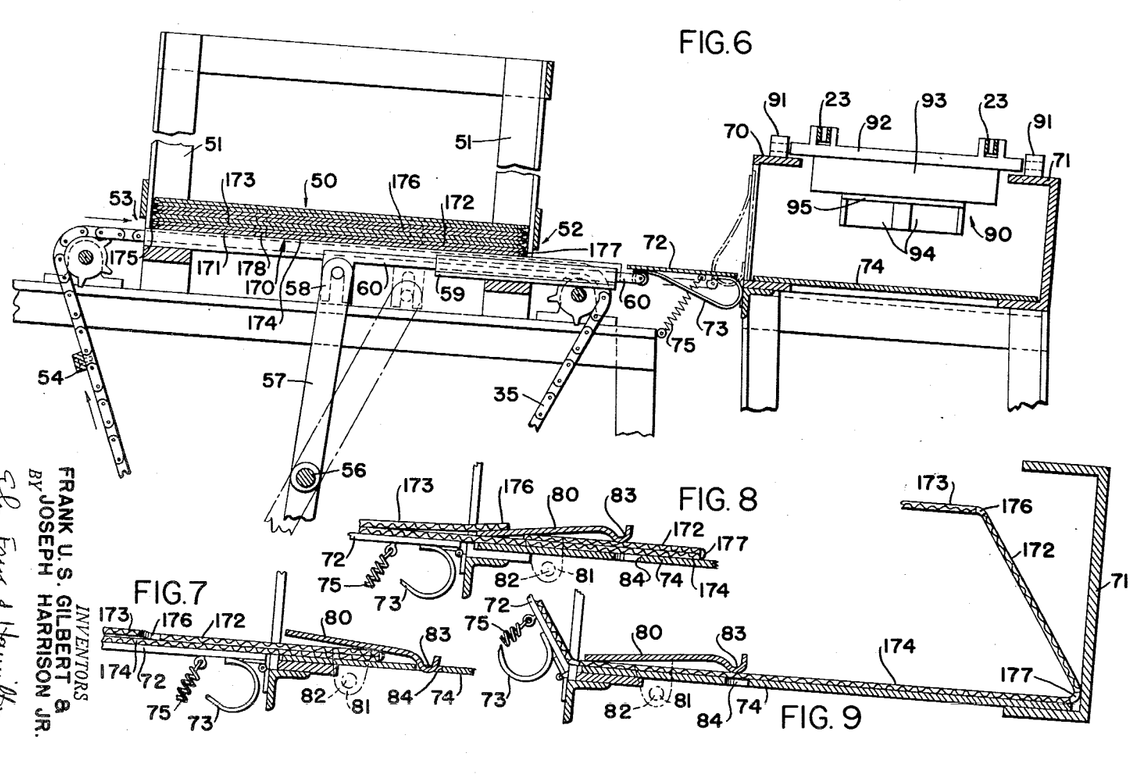
Figure 6 is a view taken on line 6—6 in Figure 1.
Figure 7 is a view taken on line 7—7 in Figure 22, but with a carton shown.
Figures 8 and 9 are views similar to Figure 7, but showing the parts in different operative positions.
Figure 10:
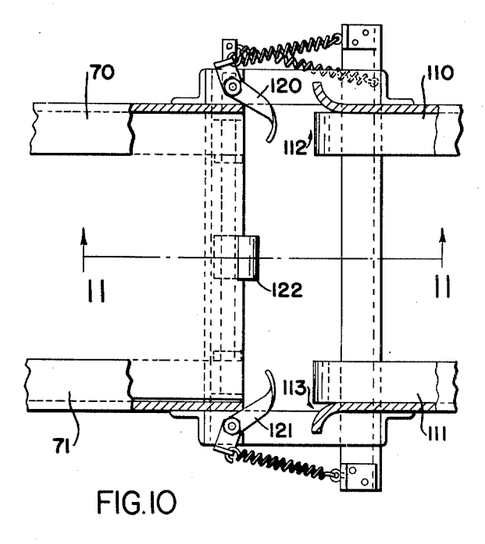
Figure 10 is a view on an enlarged scale of the underside of the central upper portion of Figure 1.
Figure 11:
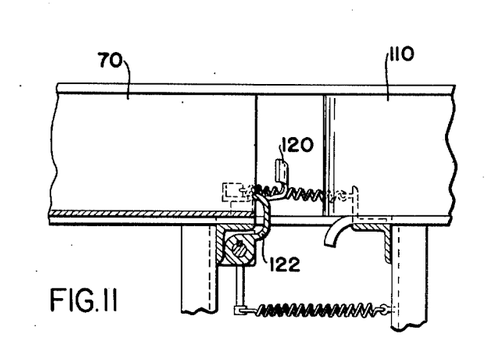
Figure 11 is a view taken on line 11—11 in Figure 10.

Below the carton magazine 10 extends a transverse shaft 56 on which is pivotally mounted a crank 57 which is operatively connected by a pin and slot connection 58 to a sliding member 60 which is guided in a slidetrack 59 extending from the underside of the carton magazine toward the carton unfolding station 11. (Figures 5 and 6.) Keyed on the camshaft 40 is a cam 61 which engages a cam follower roller 62 mounted on the lower end of the crank 57. The crank is urged to cam following position by a spring 63 which extends to a fixed rod 64 (Figure 5).

At the carton unfolding station 11 an array of guide members such as the guide beams 70 and 71 define a carton guideway approximately equal in width and height to the dimensions of cartons to be filled. As shown in Figure 6, the side of the beam 70 opposite the gap 52 is cut away and a hinged closure or gate 72 having a cam strip 73 fixed thereto is provided. In its open position, the closure 72 is approximately on a level with a deck plate 74 extending between the guide beams 70 and 71. The closure 72 is normally urged to its open position by the spring 75 but is adapted to be cammed into its closed position by interaction of the cam strip 73 and a roller mounted on the end of the sliding member 60.

As shown in Figures 1, 2, 7, 8 and 9, a carton anchoring plate 80 is located over the deck plate 72 and is fixed to a short crank arm 81 which is mounted on a fixed pivot 82 suitably supported by the frame. The plate 80 preferably comprises a depressed tail 83 adapted to pass downwardly into a slot 84 cut in the deck plate 72.

Rear flap folding and carton engaging mechanism

Figures 15, 16, 17:
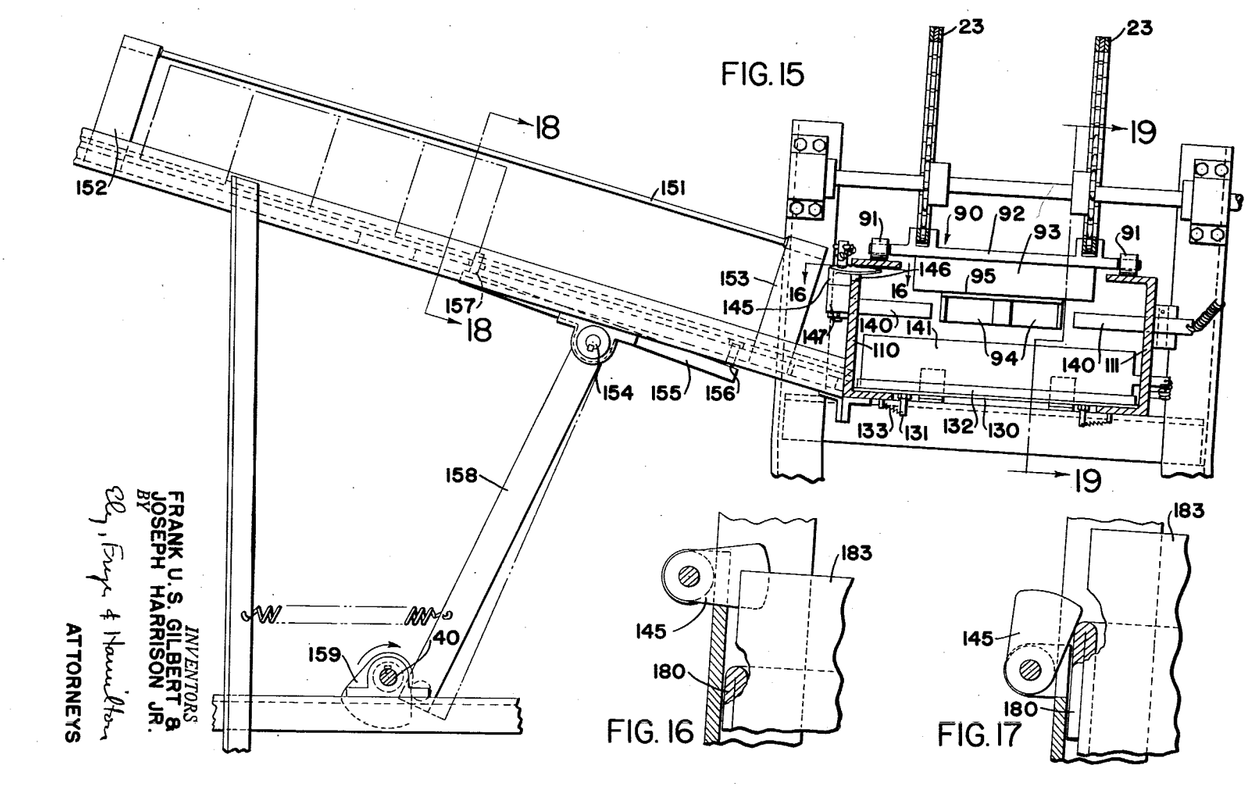
Figure 15 is a view taken on line 15—15 in Figure 1.
Figure 16 is a view taken on line 16—16 in Figure 15.
Figure 17 is a view similar to Figure 16, but showing the parts in a different operative position.

Between the chains 23 are a plurality of equally spaced carriages 90 (Figures 1, 2, 3, 4, 6, 15, 21 and 23). The carriages 90 are attached to the chains 23 as shown in Figures 6 and 15 so that on the lower pass of the chains 23, the rollers 91 on the carriages 90 are supported on the channels 70 and 71 or the channels 110 and 111, described below. Each carriage comprises a cross member 92, a depending flange 93 and a flare or tail 94 extending rearwardly from the free edge of the flange 92, each flare or tail being reinforced by a web 95.

Pivotally mounted adjacent the carton unfolding station is a lever member 100 (Figures 1-4) adapted to move in a vertical plane and urged to upright position by the spring 103. Mounted on either side of this member 100 are a pair of lever members 101 (see also Figures 22 and 23) adapted to move in a horizontal plane and normally urged to spread position by the springs 102.

Intermediate front flap folding elements

Between the carton unfolding station 11 and the can scooping station 12 are located the flap turning and plowing elements illustrated in Figures 10-13. As shown in these figures, the channels 70 and 71 terminate to be succeeded, following a short gap, by the channels 110 and 111 which have outwardly flared ends 112 and 113. On the sides and at the terminals of the channels 70 and 71 are mounted the side flap opening members 120 and 121, and centrally mounted on a cross brace extending between the lower sides of the channels 70 and 71 is a bottom flap opening member 122. The flap opening members 120, 121 and 122 are all normally urged into inwardly extending position by suitable springs, as illustrated.

Can scooping station

Figure 19:
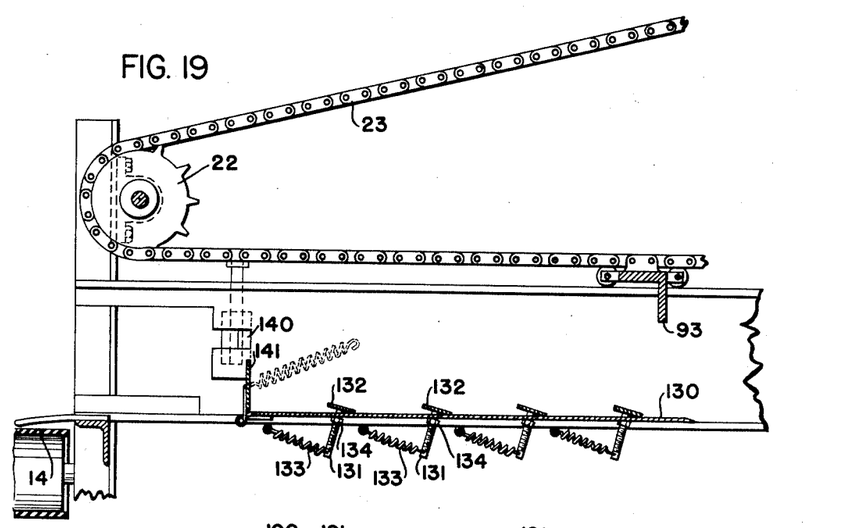
Figure 19 is a view taken on line 19—19 in Figure 15.

As shown in Figures 15 and 19, a deck plate 130 extends across the bottom of the carton path at the can scooping station 12. A series of holes on either side of this deck plate each loosely receive one of a set of threaded studs 131. A pair of studs 131 is fixed to each of the flat bars 132 which transversely extend over the deck plate 130. The studs are urged to canted position by the springs 133, the limit of cant being adjustable by tightening or loosening the nuts 134 which are threaded onto the studs 131.

At the terminal end of the path of passing cartons immediately following the can scooping station 12 are mounted a pair of side hinge members 140 and a lower hinge member 141, all of these hinge members being normally urged to closed position by springs as illustrated.

Figure 18:
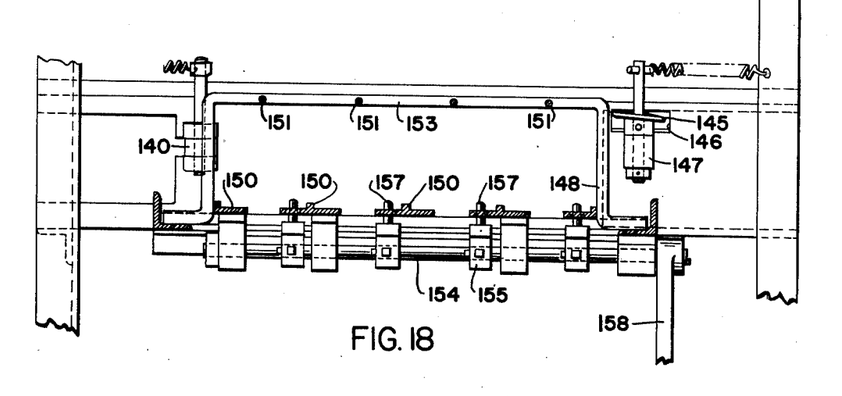
Figure 18 is a view taken on line 18—18 in Figure 15.

At the entrance to the can scooping station 12 and at one side of the path of passing cartons, a retractable leading flap suporter 145 is provided. This supporter 145 extends through a slot 146 (Figure 15) in the channel 110. The upper surface of the blade of the supporter spoons gently downwardly into the uppermost portion of the path of oncoming cartons as shown in Figures 15 and 18. The flap supporter 145 is spring loaded so as to normally be in extended position as shown in Figures 15 and 16, but it may be urged out of the way by the leading edge of a side of a passing carton as indicated in Figure 17. In Figure 15, the axis of the flap supporter 145 rotates in a bushing 147.

Can feeding mechanism

The web of the channel 110 terminates at 148 (Figure 18) in order to allow the can feed chutes 13 (Figure 1) to feed into the path of passing cartons at the can scooping station 12. The can feed chutes comprise a plurality of channels 150 which define guideways for four rows of cans in the illustrated embodiment. Extending over each guideway is a rod 151, the rods being supported at their ends by bridges 152 and 153 (Figure 15). Mounted transversely below the can guideways is a shaft 154 to which are keyed a plurality of escapement arms 155 each having an upstanding can detent 156 at its lower end and another upstanding can detent 157 at its upper end. The can detents 156 and 157 are adapted to extend through suitable slots or holes in the channels 150. The shaft 154 is actuated by a follower arm 158, which, by a suitable spring, is held in following engagement with a cam 159 mounted at the end of the cam shaft 40.

Operation

In order to fully explain the operation of the invention, the sequence of operations upon a carton will be set forth below, starting at the magazine 10 and ending when the carton is discharged upon the belt 14. For the purposes of this explanation, it will be assumed that the lowermost carton 170 is the same carton as is illustrated in the several other figures. The parts of this carton that can be seen in Figure 6 where the carton is flattened and is viewed from its rear end include the rear side flaps 171 and 172, the rear top flap 173 and the rear bottom flap 174. As is standard in cartons of this type, in order to accommodate inward folding of the flaps, notches are provided therebetween. Thus the notches 175, 176, 177 and 178 are provided between the rear flap pairs 171 and 173, 173 and 172, 172 and 174 and 174 and 171, respectively.

As a pushbar 54 enters through the slot 53 it engages the fold along a side edge of the carton 170 and the carton is caused to slide along the bars 55, through the slot 52, and over the open gate 72. As the leading side edge of the carton enters the unfolding station 11, it passes under the raised edge of the plate 80 and engages the underside of this plate—the pressure on the flap 172 causing this flap to be pressed lower than is the flap 173 so that there is a slight step between the two flaps at the notch 176, all as is clearly illustrated in Figure 7. As it continues further, the leading side edge of the carton engages the depressed tail 83 of the plate 80 and causes the leading edge of the plate 80 to be lowered through the notch 176 and under the flap 173 as shown in Figure 8, the step between the flaps 172 and 173 making this operation positive.

The pushbar 54 continues in driving engagement with the carton until the leading side edge of the carton engages the web of the guide beam 71. As the pushbar passes down out of engagement with the carton 170, the cam 61 actuates the sliding member 60 which engages the cam strip 73 causing the gate 72 to close. During this operation the bottom of the carton is held firmly in position by the plate 80 under which has passed meanwhile the majority of the width of flap 174. This stage of operation is illustrated in Figure 9.

Figure 3:
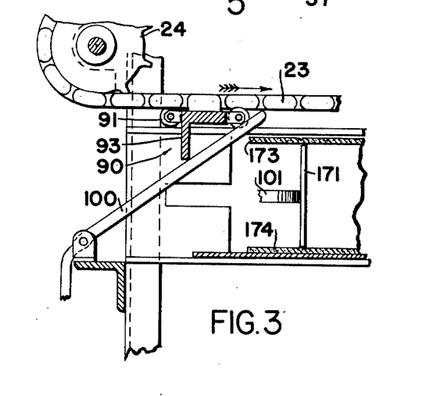
Figure 3 is a view taken on line 3—3 in Figure 2.
Figure 4:
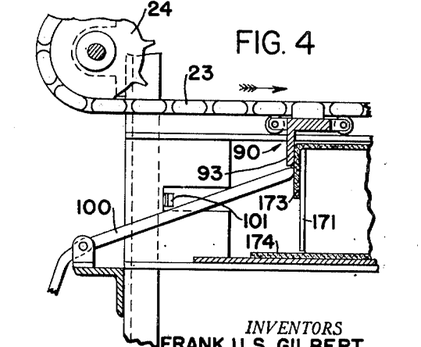
Figure 4 is a view similar to Figure 3, but showing the parts in a different operative position.

As the carton 170 unfolds into fully erect position, one of the carriages 90 passes around the sprockets 24 and enters the carton unfolding station 11. The tails 94 of the carriage engage the lever members 101 which move from their spread position shown in Figure 22 to their flap engaging position shown in Figure 23, thus folding the rear side flaps 171 and 172. Immediately thereafter, the depending flange 93 of the carriage 90 engages the lever member 100 as shown in Figure 3. The lever member 100 is thus caused to depress the upper rear flap 173 into folded position over the rear side flaps 171 and 172, the flap 173 being held in this position by the advancing flange 93 which continues to urge the entire carton forward in driving engagement as shown in Figure 4. The carton 170 is thus carried in a new direction toward the can scooping station 12, the lower rear flap 174 being thereupon pulled out from under the plate 80 which, due to its unbalanced condition, shifts back to the aspect illustrated in Figure 7 and remains ready to engage a succeeding carton.

Figure 12:
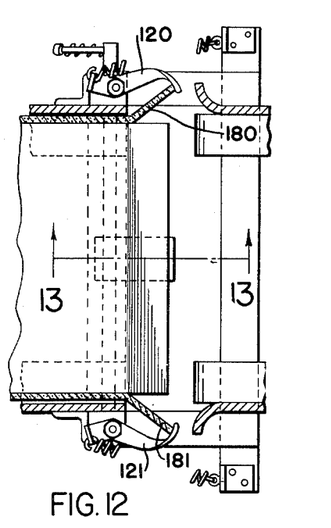
Figure 12 is a view similar to Figure 10, but showing the parts in a different operative position.
Figure 13:
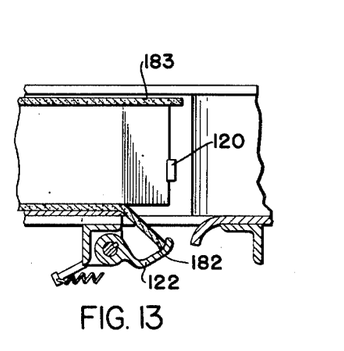
Figure 13 is a view taken on line 13—13 in Figure 12.
Figure 14:
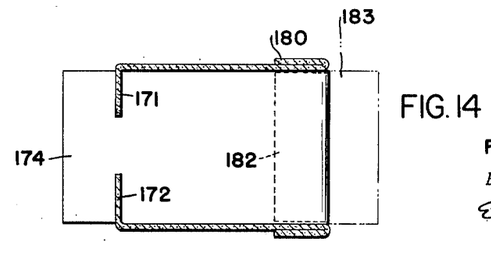
Figure 14 is a mid-height horizontal section of a carton leaving the station illustrated in Figures 10–13.

As the carton 170 is urged toward the can scooping station by the depending flange 93, the leading side flaps 180 and 181 of the carton 170 engage the flap opening members 120 and 121 respectively while the leading bottom flap 182 of the carton engages the flap opening member 122. The flap opening members are thus momentarily shifted from their normal positions shown in Figures 10 and 11, and the flaps 180, 181 and 182 are folded outwardly in a manner which is illustrated in Figures 12 and 13. As the carton 170 proceeds beyond the flap opening members, the leading flaps 180, 181 and 182 are all folded back and the top leading flap 183 continues to project forward as indicated in Figure 14.

Meanwhile, cans fed down the can feed chutes are stopped by the detents 156, the detents 156 being in raised position and the detents 157 being in lowered position the majority of the time if the cam 159 has the illustrated conformation (Figure 15). When the detents 156 are thereupon lowered and the detents 157 simultaneously raised, cans positioned therebetween are released into the can scooping station, the detents 157 restraining the additional oncoming cans. Shortly thereafter, the position of the detents 156 and 157 is again reversed, admitting additional cans into the escapement mechanism to be held by the detents 156 until subsequent discharge. The drive linkages are arranged so that the detents 156 are lowered at such a time that a new supply of cans is admitted to the can scooping station 12 between the passage therethrough of successive cartons.

Thus, as the carton 170 approaches the can scooping station 12 a supply of cans is released into this station by the escapement mechanism. At this time the bars 132 are in tilted position and incoming cans slide off the can feed chutes to be supported by the bars 132 and the deck plate 130 in the manner indicated by the left portion of Figure 21.

Figures 21, 22, 23:
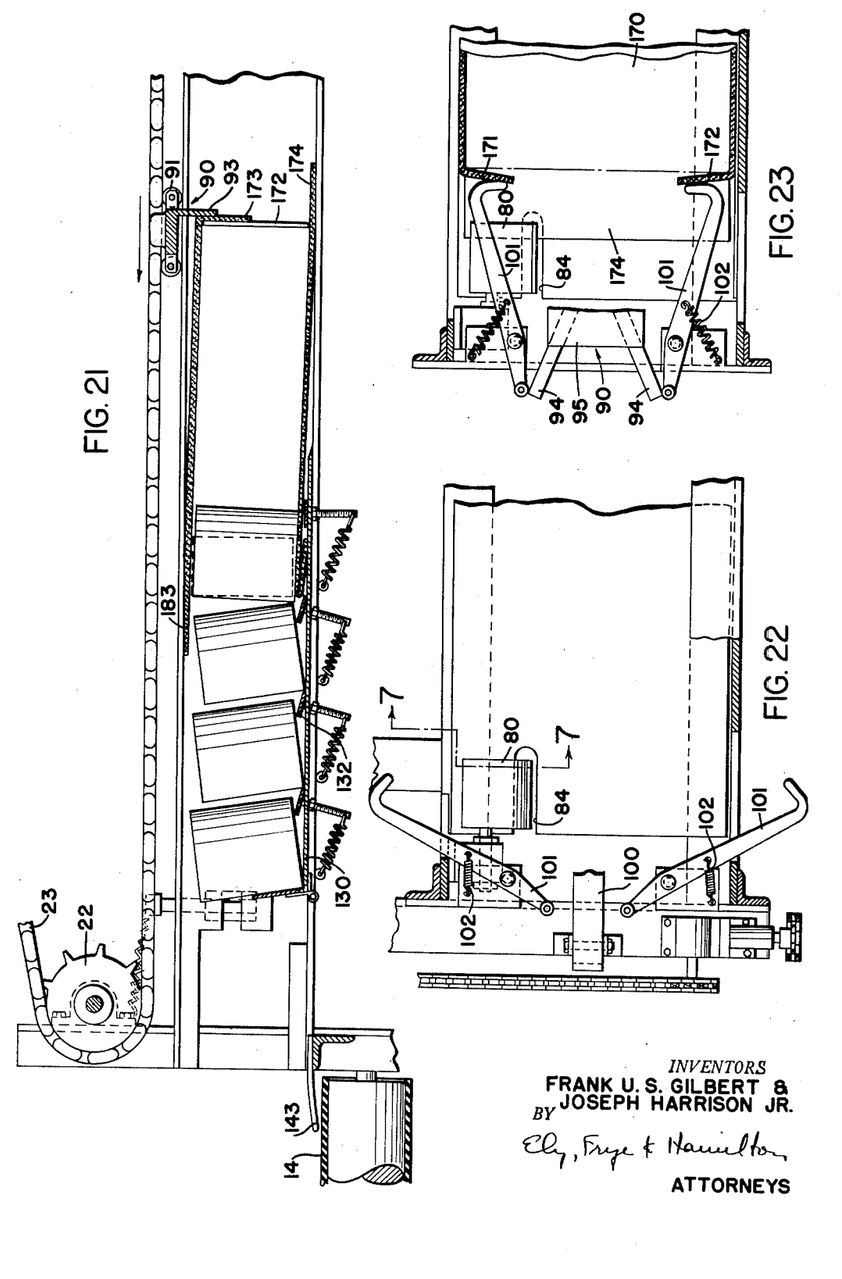
Figure 21 is a view similar to Figure 19, but showing the position of the parts as an array of cans is being scooped up by a passing carton.
Figure 22 is a view taken on line 22—22 in Figure 2.
Figure 23 is a view similar to Figure 22, but showing the parts in a different operative position and a carton being acted upon.

As the carton 170 enters the can scooping station 12, the leading upper flap 183 engages the upper spooned surface of the flap supporter 145 to be temporarily lifted or held thereby as shown in Figure 16 so that the leading edge of the flap 183 passes over the upper rims of the first row of cans encountered in the can scooping station 12. As the carton 170 continues its forward travel, the folded edge between the leading side flap 180 and the corresponding side of the carton 170 engages the blade of the flap supporter 145 to urge it out of the way as shown in Figure 17. Meanwhile, the flap 183 has passed over the first row of cans and the bottom of the carton 170 has flattened the first of the bars 132, the flap 183 continuing to be held upwardly by the aspect of the several cooperating elements, as shown in Figure 21. The carton 170 continues on its path, flattening successive bars 132 and scooping up successive rows of cans. During the can scooping operation, the cans are held in position within the can scooping station by the side hinge members 140 and the bottom or transverse hinge member 141. As the leading side edges and bottom edge of the carton 170 strike these hinge members, they are forced out of the way, allowing the loaded carton to be urged over the verge 143 and to be discharged onto the belt 14, the corresponding carriage 90 thereupon passing around the sprockets 22 to continue on another cycle.

The carton 170 is carried away on the belt 14 to be labelled and to have its flaps closed and glued or stapled by any one of a number of conventional methods which will be familiar to those with a working knowledge of packaging equipment.

Figure 20:
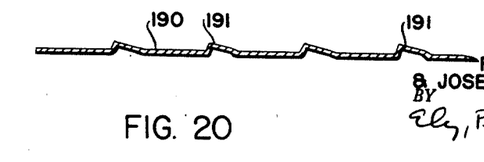
Figure 20 illustrates an alternative to some of the structure shown in Figure 19.

Figure 20 illustrates an alternative structure for tilting the cans at the can scooping station. This structure is particularly applicable to operations in which cartons comprising resilient paperboard or other resilient material are used. The plate 190 shown in Figure 20 replaces the deck plate 130 shown in Figures 19 and 21, the bars 132 and studs 131 being eliminated. The position of the humps 191 in the plate 190 is equivalent to the position of the bars 132 as shown in Figure 19. When the plate 90 is used, the leading lower edge of the carton rides up the first hump 191 to scoop the first row of cans and thereupon the leading lower edge is caused to snap down upon the plate 190 beyond the first hump 191 due to the resiliency of the carton walls. This operation is repeated as the leading lower edge of the carton passes over successive humps 191.

It will be obvious that variations in many mechanical details of the disclosed embodiment of the invention may be made. For instance, an entirely different drive linkage for powering the several elements might be provided, or several independent but synchronized power units might be provided. Some of the elements which are actuated by engagement with the cartons, such as the hinge members 140 and 141 might be separately positively actuated in proper sequence with the rest of the operations. Some of the flap folding and plowing operations might be done in different sequence or might be postponed until after the operation of filling the cartons is completed. The loaded cartons may not be discharged onto a belt such as 14 but may be carried away from the can scooping station in a continuous path.

Accordingly, it should be apparent that the scope of the invention extends well beyond the specific details of the disclosed embodiment, which embodiment has been fully set forth in complete detail in order to provide the art with a complete disclosure of a practical example of the invention. The scope of the invention is defined in the following claims.

What is claimed is:

1. In a can packing machine, a plurality of can delivery tracks terminating in parallel can-canting elements disposed to cant cans held thereon in a first direction so that the lower rims thereof are raised on the side thereof opposite to said first direction to a level above the highpoints of said can-canting elements, carton transposing means to transpose cartons in said first direction in rectilinear attitude with an open side forward along a path extending transversely across said can-canting elements of said can delivery tracks, said carton transposing means being positioned so that cartons transposed along said path are brought in oversliding contact with said can-canting elements, whereby raised sides of lower rims of cans supported on said can-canting elements are engaged by leading lower edges of said cartons to cause said cans to be scooped up by said cartons.

2. In a device as defined in claim 1, a can-retaining barrier movable between a first can-retaining position across said path just beyond said can-canting elements and a second non-retaining position, means to maintain said barrier in said first position during approach of a carton along said path toward said barrier and onto said can-canting elements and to shift said barrier to said second position substantially simultaneously with positioning of an approaching carton over all of said can-canting elements.

3. In a machine for automatically packing cans into paperboard cartons each comprised of a length of paperboard tube folded along longitudinal lines and having deep narrow notches extending along said fold lines from the ends of said tube to define carton end flaps, said cartons being supplied in flattened substantially planar form as a stacked array with each tube extending along a first direction and the uppermost opened fold of each tube extending adjacent a first side of said stacked array, a magazine-loading mechanism comprising a magazine adapted to receive said stacked array and retain individual cartons in stacked position, said magazine having at least one cut-out adjacent the lower edge thereof and on the side thereof corresponding to said first side of said stacked array, said cut-out being of such dimensions as to accommodate translation of only the lowermost carton in said stacked array out from under said stacked array along a first path normal to said first direction and extending from said first side of said array, first guideways defining said first path, means to successively so translate the lowermost carton in said stacked array, vertical stop means at the end of said first path engageable initially by the leading fold of a carton approaching along said first path and subsequently by the leading side of said carton immediately above said leading fold, a hold-down member extending back along said first path from a point which is spaced from said stop means a distance equal to the height of said leading side of said approaching carton to a point which is not substantially more than twice said distance from said stop means, said hold-down member being positioned to one side of said first path whereby the bottom of the leading edge thereof is positioned for engagement by the closest end tab corresponding to said leading side of said approaching carton, said hold-down member having a downwardly sloped trailing portion and being mounted for pivoting movement about an axis substantially transverse to said first path, whereby ensuing engagement of said closest end tab with said trailing portion will cause said leading edge of said hold-down member to be urged through the one of said deep narrow notches presented thereto and further movement of said carton along said path will cause the entire length of said hold-down member to have passed through said one notch not later than at the time of engagement of said stop means by said carton.

4. A device as defined in claim 3 including second guideways normal to said first guideways and defining a second path for expanded cartons normal to said first path and means to engage expanded cartons and urge them along said second path.

5. In a machine for automatically packing cans into paperboard cartons each comprised of a length of paperboard tube folded along longitudinal lines and having deep narrow notches extending along said fold lines from the ends of said tube to define carton end flaps, said cartons being supplied in flattened substantially planar form as a stacked array with each tube extending along a first direction and the uppermost opened fold of each tube extending adjacent a first side of said stacked array, a mechanism for loading cartons into the machine comprising means to successively supply cartons from said stacked array and to translate said cartons along a given path normal to said first direction and extending from said first side of said stacked array, first guideways defining said first path, stop means at the end of said first path engageable initially by the leading fold of a carton approaching along said first path and subsequently by the leading side of said carton immediately above said leading fold, a hold-down member extending back along said first path from a point which is spaced from said stop means a distance equal to the height of said leading side of said approaching carton to a point which is not substantially more than twice said distance from said stop means, said hold-down member being positioned to one side of said first path whereby the bottom of the leading edge thereof is positioned for engagement by the closest end tab corresponding to said leading side of said approaching carton, said hold-down member having a downwardly sloped trailing portion and being mounted for pivoting movement about an axis substantially transverse to said first path, whereby ensuing engagement of said closest end tab with said trailing portion will cause said leading edge of said hold-down member to be urged through the one of said deep narrow notches presented thereto and further movement of said carton along said path will cause the entire length of said hold-down member to have passed through said one notch not later than at the time of engagement of said stop means by said carton.

6. A device as defined in claim 5 including second guideways normal to said first guideways and defining a second path for expanded cartons normal to said first path and means to engage expanded cartons and urge them along said second path.

7. In an automatic can packing machine, guideways defining a given path for transposition of expanded paperboard cartons in rectilinear attitude, means to feed unexpanded paperboard cartons into said given path along a second path normal to said given path and to expand said cartons to position them within said given path, means to feed rectilinear arrays of cans into said given path along a third path normal to said first path and to position said rectilinear arrays within said given path, said last named means including means to cant the bottom edges of cans in said so positioned rectilinear arrays above the bottom of said given path for scooping engagement by expanded cartons carried thereto along said given path, and means to convey said cartons along said given path from the terminus of said second path past the terminus of said third path.

8. In a device as defined in claim 7, a can-retaining barrier movable between a first can-retaining position across said given path just beyond said terminus of said third path and as second non-retaining position, means to maintain said barrier in said first position during approach of a carton along said given path toward said barrier and into said terminus of said third path and to shift said barrier to said second position substantially simultaneously with positioning of an approaching carton completely throughout said terminus of said third path.

9. In a can packing machine, a plurality of can delivery tracks terminating in parallel alignment at a terminus, the terminal end of each of said tracks comprising canted portions narrower than the cans to be packed whereby raised lower edges of canted cans are positioned above said canted portions and face a first side of said terminus, carton transposing means to transpose cartons through said terminus from said first side thereof in rectilinear attitude with an open side forward along a path the bottom of which extends below the location of said raised lower edges of canted cans whereby said raised lower edges of canted cans are engaged by leading lower edges of said cartons to cause said cans to be scooped up by said cartons.

10. A device as defined in claim 9 in which said canted portions of said tracks are mounted for movement between fully canted positions and positions of reduced cant, means resiliently urging said canted portions to their fully canted positions, and camming surfaces associated with said canted portions and sloping through the bottom of said path whereby said camming surfaces are engageable by said leading lower edges of said cartons to cause said canted portions to move to said positions of reduced cant.

11. In a can packing machine, a plurality of can delivery tracks terminating in parallel alignment at a terminus, the terminal end of each of said tracks comprising canted portions narrower than the cans to be packed whereby raised lower edges of canted cans are positioned above said canted portions and face a first side of said terminus, carton transposing means to transpose cartons through said terminus from said first side thereof in rectilinear attitude with an open side forward along a path the bottom of which extends below the location of said raised lower edges of canted cans whereby said raised lower edges of canted cans are engaged by leading lower edges of said cartons to cause said cans to be scooped by said cartons, a can-retaining barrier movable between a first can-retaining position across said path just beyond said terminus and a second non-retaining position, means to maintain said barrier in said first position during approach of a carton along said path toward said barrier and to shift said barrier to said second position substantially simultaneously with positioning of an approaching carton completely throughout said terminus.

12. A device as defined in claim 11 in which said canted portions of said tracks are mounted for movement between fully canted positions and positions of reduced cant, means resiliently urging said canted portions to their fully canted positions, and camming surfaces associated with said canted portions and sloping through the bottom of said path whereby said camming surfaces are engageable by said leading lower edges of said cartons to cause said canted portions to move to said positions of reduced cant.

13. In a can packing machine, guideways defining a given path for transposition of expanded paperboard cartons in rectilinear attitude, means to feed unexpanded paperboard cartons into said given path along a second path normal to said given path and to expand said cartons to position them within said given path, a plurality of can delivery tracks terminating in parallel alignment at a terminus, the terminal end of each of said tracks comprising canted portions narrower than the cans to be packed whereby cans supported thereon are canted and raised lower edges of canted cans are positioned above said canted portions and face a given side of said terminus, said given path extending across said terminus from said first side thereof, the bottom of said given path extending below the location of said raised lower edges of canted cans, and means to convey cartons positioned within said given path along said given path whereby said cartons cross said terminus and scoop cans supported on said canted portions.

14. A device as defined in claim 13 in which said canted portions of said tracks are mounted for movement between fully canted positions and positions of reduced cant, means resiliently urging said canted porsions to their fully canted positions, and camming surfaces associated with said canted portions and sloping through the bottom of said given path whereby said camming surfaces are engageable by leading lower edges of cartons crossing said terminus to cause said canted portions to move to positions of reduced cant.

15. In a can packing machine, guideways defining a given path for transposition of expanded paperboard cartons in rectilinear attitude, means to feed unexpanded paperboard cartons into said given path along a second path normal to said given path and to expand said cartons to position them within said given path, a plurality of can delivery tracks terminating in parallel alignment at a terminus, the terminal end of each of said tracks comprising canted portions narrower than the cans to be packed whereby cans supported thereon are canted and raised lower edges of canted cans are positioned above said canted portions and face a given side of said terminus, said given path extending across said terminus from said first side thereof, the bottom of said given path extending below the location of said raised lower edges of canted cans, means to convey cartons positioned within said given path along said given path whereby said cartons cross said terminus and scoop cans supported on said canted portions, a can retaining barrier movable between a first can-retaining position across said given path just beyond said terminus and a second non-retaining position, means to maintain said barrier in said first position during approach of a carton along said given path toward said barrier and into said terminus and to shift said barrier to said second position substantially simultaneously with positioning of an approaching carton completely across said terminus.

16. A device as defined in claim 15 in which said canted portions of said tracks are mounted for movement between fully canted positions and positions of reduced cant, means resiliently urging said canted portions to their fully canted positions, and camming surfaces associated with said canted portions and sloping through the bottom of said given path whereby said camming surfaces are engageable by leading lower edges of cartons crossing said terminus to cause said canted portions to move to positions of reduced cant.

No references cited.